(12) United States Patent
Costanzi et al.

(10) Patent No.: US 7,608,654 B2
(45) Date of Patent: Oct. 27, 2009

(54) HALOGEN-FREE FLAME RETARDANT POLYCARBONATE COMPOSITIONS

(75) Inventors: Silvestro Costanzi, Genoa (IT); Maurizio Leonardi, Genoa (IT)

(73) Assignee: Italmatch Chemicals S.p.A., Genoa (IT)

(*) Notice: Subject to any disclaimer, the term of this patent is extended or adjusted under 35 U.S.C. 154(b) by 254 days.

(21) Appl. No.: 10/578,610

(22) PCT Filed: Nov. 7, 2003

(86) PCT No.: PCT/IB03/04986
§ 371 (c)(1), (2), (4) Date: May 8, 2006

(87) PCT Pub. No.: WO2005/044906
PCT Pub. Date: May 19, 2005

(65) Prior Publication Data
US 2007/0082995 A1    Apr. 12, 2007

(51) Int. Cl.
*C08K 3/32* (2006.01)
(52) U.S. Cl. ...................................... 524/414
(58) Field of Classification Search .................. 524/414
See application file for complete search history.

(56) References Cited

U.S. PATENT DOCUMENTS

| | | | |
|---|---|---|---|
| 3,833,537 A | 9/1974 | Jaquiss | |
| 5,061,745 A * | 10/1991 | Wittmann et al. | 524/139 |
| 5,256,718 A | 10/1993 | Yamamoto et al. | |
| 6,013,707 A | 1/2000 | Kleiner et al. | |
| 6,136,892 A | 10/2000 | Yamauchi et al. | |
| 6,448,316 B1 | 9/2002 | Hirano et al. | |
| 6,503,969 B1 | 1/2003 | Klatt et al. | |
| 7,169,838 B2 | 1/2007 | Engelmann et al. | |
| 2003/0171494 A1 | 9/2003 | Aramaki et al. | |
| 2004/0051088 A1 | 3/2004 | Schlosser et al. | |
| 2005/0137297 A1 | 6/2005 | De Wit | |

FOREIGN PATENT DOCUMENTS

| | | | |
|---|---|---|---|
| CA | 1219390 | * | 3/1987 |
| DE | 101 37 930 | | 2/2003 |
| EP | 0 442 465 A2 | | 8/1991 |
| EP | 0 699 708 A2 | | 3/1996 |
| JP | 51-59946 | * | 5/1976 |
| WO | 99/57187 | | 11/1999 |
| WO | 03/014212 A1 | | 2/2003 |

OTHER PUBLICATIONS

International Search Report for PCT/IB2003/004986 dated Mar. 12, 2004.
Database CA 'Online! Chemical Abstracts Service, Asano, *Fire-, heat-, and impact-resistant thermoplastic resin compositions*, XP002271202 and JP 2002-161211 Jun. 4, 2002.
International Search Report of PCT/IB2004/001891, mailed Feb. 1, 2005.

* cited by examiner

*Primary Examiner*—Peter Szekely
(74) *Attorney, Agent, or Firm*—Nixon & Vanderhye P.C.

(57) ABSTRACT

The present invention relates to a thermoplastic halogen-free flame retardant composition comprising at least an hypophosphorous acid metal salts as halogen-free flame retardant agent, and at least an aromatic polycarbonates resin and/or its blends. The flame retardant composition may in addition comprise additives and fillers. The invention also refers to moulded thermoplastic articles made by using the flame retardant composition.

22 Claims, No Drawings

HALOGEN-FREE FLAME RETARDANT POLYCARBONATE COMPOSITIONS

This application is the US national phase of international application PCT/IB2003/004986 filed 7 Nov. 2003 which designated the U.S., the entire contents of which are hereby incorporated by reference.

SUBJECT OF THE INVENTION

The present invention relates to halogen free flame retarded polycarbonates and polycarbonate blends articles and a process for their preparation.

BACKGROUND OF THE INVENTION

As an alternative for the well known halogen based—flame retardant containing systems, in the last years the market is increasingly interested in halogen free flame retardant additives to be used in the production of corresponding flame-retardant compositions, generally speaking thermoplastic compositions.

Significant requirements for these products are: high flame retardant effectiveness in reinforced and unreinforced articles, pale intrinsic colour, good heat stability and good mechanical and electrical properties.

The known halogen-free flame retardant additives mostly used in thermoplastic polymers are:

Inorganic flame retardants belonging to the metal hydroxide group (Magnesium hydroxide and Aluminium hydroxide). These products must be used in large amounts to be effective and therefore show, as a drawback, that the mechanical properties of the related thermoplastic articles are dramatically damaged.

Melamine derivatives, like melamine cyanurate, melamine (poly)phosphate or melamine pyrophosphate. These products do not have sufficient thermal stability for overcoming the processing conditions of some thermoplastic polymer like for example polycarbonates, and therefore cannot be used as universal additives.

Organic derivatives of phosphoric acid such as phosphoric esters (valence state of P=+5). These products are not very effective, tend to bleed out on exposure to heat and are generally in a liquid status, being therefore difficult to handle. In addition they are not hydrolytically stable, therefore when used in Polycarbonates they produce high phenol values during processing and affect mechanical and thermal properties of final articles. Although many improvements have been introduced with the new high molecular weight products such as the condensate phosphate esters having a structure which is derived from Bisphenol A (JP open publication 6-228426), however the related polymer articles do not have fully satisfactory performances due to the unbalanced combination of flammability with impact resistance, heat stability and weather resistance.

Red-Phosphorus has been proven to be an effective flame retardant additive for opaque polycarbonate and/or PC/ABS alloys (U.S. Pat. Nos. 4,014,849; 6,448,316; 6,465,555; EP 0893475) but unfortunately its inherent deep-red colour makes the related polymer product difficult to penetrate the market.

Potassium salts of organic sulphonates, such as for example: potassium perfluorobutansulfonate, are also effective flame retardant additives for polycarbonate articles with a thickness of for example about 3 mm but they generally fail when used in the preparation of thinner articles, in filled polymers and in PC/ABS alloys.

Hypophosphorous acid metal salts as halogen free flame retardant agent, have been described since 1986 (U.S. Pat. No. 4,618,633) for fire proofing styrene containing polymers like: polystyrene (PS), high impact polystyrene (HIPS), styrene-acrylonitrile copolymers (SAN), acrylonitrile-butadiene-styrene polymers (ABS). These hypophosphorous acid metal salts, with particular regard to Calcium hypophosphite, have been described to be effective in polyester resin compositions when used in combination with nitrogen containing compounds like: melamine cyanurate, melamine polyphosphate, melamine borate, melamine pyrophosphate, ureaphosphate or similar products (U.S. Pat. No. 6,503,969; WO 09817720; DE 19904814; DE 10137930; EP 0919591).

OBJECT OF THE INVENTION

It is an object of the present invention to provide flame retardant halogen-free thermoplastic moulding compositions as well as flame retarded corresponding thermoplastic moulded articles comprising them.

Another object of the present invention is to provide halogen-free flame retarded moulded articles characterised by a very low thickness, for example about 1.5 mm, which maintain high thermal stability during processing, low phenol emission, high degree of retention of mechanical properties and good weather resistance.

Still another object of the present invention is to provide halogen-free flame retarded moulded articles ranking V0, according to UL 94 classification.

DESCRIPTION OF THE INVENTION

The present invention relates to a thermoplastic composition comprising at least an hypophosphorous acid metal salts as halogen-free flame retardant agent.

According to the present invention, the thermoplastic moulding composition comprises at least an aromatic polycarbonate resin and at least an hypophosphorous acid metal salts.

Always according to the present invention, the aromatic polycarbonate resin may be blended with a graft copolymer styrenic resin, for example in a ratio of aromatic polycarbonate resin/graft copolymer styrenic resin from 60/40 to 90/10.

The hypophosphorous acid metal salts might be present in an amount up to 30% by weight and is preferably a Calcium or Aluminium salt.

Said phosphorus compounds develop very good flame retardant effect if loaded from 1% to 30% weight on the weight of the composition, as sole additive as well as in combination with halogen-free organic phosphoric esters.

Always according to the present invention, the thermoplastic moulding composition may optionally comprise additives and inorganic fillers. More particularly, said additives might be present in an amount ranging from 0.5 to 5% by weight and might be selected from: processing aids, heat and process stabilisers, UV stabilisers, antidripping agents (PTFE—polytetrafluoroethylene), pigments, etc. Said fillers might be from 5% to 50% by weight.

The total of percentage by weight of components are 100%.

The compositions according to the present invention show very good flame retardant properties and does not comprise any halogen based flame retardant agent. The moulded articles obtained using the compositions according to the invention maintain high thermal stability, for example during their processing, low phenol emission, high retention of mechanical properties and good weather resistance. Furthermore, the compositions according to the present invention are used for the preparation of thermoplastic articles which are ranked V0 according to UL 94 classification. The thermoplastic moulding composition according to the present invention, is based on an aromatic polycarbonate resin which may be an unfilled aromatic polycarbonate resin, as well as an aromatic polycarbonate resin filled with an inorganic filler selected for example among talc, glass fibers, carbon fibers, chalk, mica, wollastonite or similar products. Said inorganic fillers can be used as such or in mixture up to a level of 50% by weight on weight of polymer.

Always according to the invention, said aromatic polycarbonate resin may be blended with an elastomeric phase, like ABS, used at a concentration from 10 to 40% by weight on the weight of resin.

Optionally the above mentioned thermoplastic compositions may comprise processing aids, heat and UV stabilisers, pigments and colorants, antidripping agents.

It has been surprisingly found that hypophosphorus acid metal salts, with particular reference to the commercial available calcium hypophosphite and aluminium hypophosphite, are very effective flame retardant agents for polycarbonate based thermoplastic moulding compositions. The hypophosphorus acid metal salts according to the present invention do not need the presence of any nitrogen containing compounds in order to show their flame retardant activity. Therefore, there is no more need to use any nitrogen based compound such as melamine cyanurate, melamine polyphosphate, melamine borate, melamine pyrophosphate, ureaphosphate or similar products as described in the previously cited prior art in association with hypophosphorus acid metal salts in order to obtain a very significant flame retardant activity, according to the invention.

The invention is described in detail herein after with particular regard to the major components which constitute the flame retardant thermoplastic composition according to the invention.

First mentioned are one of the component of the thermoplastic composition, particularly the polycarbonate resin (PC).

In the meaning of the invention polycarbonate resin is any aromatic polycarbonate produced by reacting diphenols and carbonate precursors. For example those polycarbonate produced through the reaction of a diphenol and phosgene or through the transesterification reaction of a diphenol and diphenylcarbonate.

Various diphenols are usable including 2,2bis(4-hydroxyphenyl)propane (bisphenolA), bis(4-hydroxyphenyl)methane, 1,1-bis(4-hydrophenyl)ethane or similar products. As the diphenols for use in the present invention, preferred are bis(hydroxyphenyl)alkanes especially preferred bisphenol A. Other diphenols are also usable according to the invention such as for example hydroquinone, resorcinol, and catecol. All the above mentioned diphenols may be used as such or even in combination.

The polycarbonate resin may also have a branched structure which has been obtained by including one of the following branching agent as a component of the reaction mixture during its preparation: 1,1,1-tris(hydroxyphenyl)ethane, trimellitic acid, isatin-bis(o-cresol).

For checking the molecular weight of the polycarbonate resin, are often used, according to the prior art, monophenols; the most suitable products are: phenol, p-t-butylphenol, p-cumylphenol.

The polycarbonate resin for being used according to the present invention may be a copolymer having a polycarbonate moiety and a polyorganosiloxane moiety or a polyester moiety.

It is also an advantage using recycled polycarbonate materials (also named scrap PC) as such or in mixture with virgin polycarbonate polymer or also blended with an impact modifier resin.

The recycled materials are generally selected among:
post industrial products such as sprues from injection moulding, start up material from injection moulding and extrusion or edge trims from extruder sheets or films;
post consumer recycled materials such as those collected and treated after utilization by end consumer.

Said recycled materials may be used as pellets or as regrind

The impact modifier resins are generally copolymers which contain at least two of the following monomers: ethylene, propylene, butadiene, isobutene, isoprene, vinyl acetate, styrene, acrylonotrile, acrylate and/or metacrylate.

Some preferred types of impact modifiers are those known as ethylene-propylene (EPM) and ethylene-propylene-diene (EPDM) rubbers.

EPM and EPDM rubbers can preferably have been grafted with reactive carboxilic acids or with derivatives of these such as for example: acrylic acid, methacrylic acid, maleic anhydride.

In order to save the mechanical properties and the mouldability of the compounds it is desirable that the polycarbonate resin has an average Molecular Weight from 10000 to 50000.

At last it is advisable to pre dry both polycarbonate virgin resin and the recycled material up to a level of moisture from 0.2% to 0.6% w before extruding or moulding.

Additional component: graft copolymer styrenic resin.

The below indicated components, according to the present invention are optional but, when they are used, are preferably selected among the rubber modified styrenic resins, for example those produced through a grafting polymerization reaction of rubber with a styrenic monomer. These products include: impact resistant polystyrene (HIPS), as produced through the polymerization reaction of rubber polybutadiene and styrene, ABS resins as produced through the polymerization of polybutadiene rubber with acrylonitrile and styrene, MBS resins as produced through the polymerization reaction of polybutadiene rubber with methyl methacrylate and styrene.

In the rubber modified styrenic resins, the amount of rubber should preferably be in the range from 5 to 15% by weight. If the rubber content is lower than 5% the resin composition will have poor impact resistance and, on the other hand, if the rubber content is higher than 15% the thermal stability of the resin composition will be poor and the melt viscosity will be too high.

Always according to the invention, the styrenic resin to be the additional component is dispersed in the polycarbonate matrix in order to improve both the melt fluidity of polycarbonate as well as the impact resistance of final polymer articles.

In the resin mixture, the amount of styrenic resin is from 5% to 50%, preferably from 10% to 40% by weight based on the weight of total resins.

If the amount of polycarbonate resin is lower than 50%, the heat stability, the mechanical and thermal properties of the final articles will be very poor. On the other hand, if the styrenic resins are lower than 5% by weight they will be uneffective in improving the mouldability of the resin composition.

The composition according to the present invention comprises at least an hypophosphorous acid metal salts, particularly from 1 to 30% by weight on weight of moulding composition, preferably from 2% to 15% by weight.

The "metal" which acts as a counter ion in the hypophosphorous acid metal salts is an alkaline metal belonging to the first, second and third main group or second, seventh, eighth subgroup of the periodic table of the elements.

Among said salts, have to be preferred those where the following metals act as counter ion: Ca, Ba, Mg, Al, Zn, Fe, B, being the most preferred the commercially available Calcium hypophosphite and Aluminium hypophosphite.

Always according to the invention, calcium or aluminium hypophosphite can be used as such or in combination with organic phosphorus containing flame retardants, preferably non-halogen compounds.

The non-halogen, organic phosphorus containing flame retardants which may be used in addition to the hypophosphorous acid metal salts according to the invention for example may be selected among the organic phosphoric esters (phosphate esters) including for example the following commercially available products: triphenylphosphate (TPP), tricresyl phosphate, trixylilenphosphate, resorcinoldiphosphate, resorcinolbis diphenylphosphate, bisphenol A bis diphosphate, trimethylphosphate, tributylphosphate, trioctylphosphate or similar products. According to the invention, the amount of organic phosphoric esters compared to the amount of the inorganic hypophosphite should be in the range from ½ to ⅕, in order to reduce the bleed out of the products during compounding and moulding and not to affect the mechanical and thermal properties of final polymer articles.

In order to improve the flame retardant effectiveness of the hypophosphorous acid metal salts, it is advisable that the average particle size of the powder (d50%) is lower than 40 µm and the highest particle size is below 100 µm, more particularly it is preferable that d50% is below 20 µm and the highest particle size is below 50 µm.

According to the present invention, the halogen-free thermoplastic composition may also comprises additives, for example processing aids, stabilisers, etc.

Therefore, novel thermoplastic moulding compositions may contain as additional component one or more of the following conventional processing aid products such as, for example, heat stabilisers, UV stabilisers, lubricants, mould releasing agents, colorants, plasticizers, etc.

Examples of heat stabilisers are sterically hindered phenols and/or aromatic phosphites or phosphonites, hydroquinones and mixture of these to be used in concentration of up to 1% weight on the weight of polymer.

UV stabilisers which are usually added in an amount of up to 2% weight on the weight of polymer composition are various salycilates, resorcinols, benzotriazols, benzophenones and hindered amines derivatives.

As lubricants and mould releasing agents are preferably selected long chain fatty acid, like stearic acid, or fatty acid salts, like sodium, calcium or zinc stearate, or montan waxes, or an ester or amide obtained by reacting saturated aliphatic carboxylic acids having from 10 to 40 carbon atoms, preferably from 16 to 22 carbon atoms, with saturated aliphatic alcohols or amines having from 2 to 40 carbon atoms, preferably from 2 to 6 carbon atoms. Examples of preferred esters and amides are: pentaerythritol tetrastearate, glycerol trilaurate, sorbitan dioleate, ethylenediamine distearate.

Among colorants the preferred products are selected among inorganic pigments like titanium dioxide, iron oxide, carbon black but can be also used as organic pigments phthalocyanines, quinacridone, perylene, nigrosine, anthraquinones.

The novel moulding composition may also contain, as an additional component, fluorine-containing ethylene polymers which exhibit a resin melt dropping preventing effect when the composition is fired. These products can be used in an amount of up to 2%, preferably up to 1%, based on the weight of thermoplastic composition.

Examples of these fluorine-containing ethylene are: polytetrafluoroethylene (PTFE) or tetrafluoroethylene-hexafluoropropylene copolymers, at the date of the filing of the present application available in the market with Algoflon™. Particularly preferred are those fluorine containing polymers with particle size from 0.1 µm to 10 µm.

The flame retardant moulding composition of present invention may further contain as additional component a plasticizer to be used in an amount of up to 2% by weight on the weight of thermoplastic composition. Said products generally enhance the dispersion of inorganic materials in the polymer matrix. Examples of the used plasticizers include phthalates, silicons or also organosiloxanes bringing functional groups like hydroxyl, carboxyl, amino, or epoxy group.

Always according to the invention, the thermoplastic moulding composition may comprise, as additional component filler.

In the meaning of the present invention, filler can be any fibrous or particulate substance known in the art and acting as reinforcement agent such as carbon fibers, glass fibres, glass beads, amorphous silica, kaolin, chalk, mica, calcinated kaolin, wollastonite, talc or similar products.

In order to improve the compatibility with thermoplastic resins, the fibrous fillers may have been surface treated with a silane compound and the particulate substances may have been surface treated with fatty acids or the like or may have been milled in presence of fatty acids or the like.

Any particulate substance available into the market as an additive for thermoplastic resin is suitable for the use in the composition according to the invention, provided that the average size of the granules is comprised in the range from 2 µm to 20 µm.

When used, the amount of the particulate substance to be added to the resin composition is up to 40%, preferably up to 30% by weight on the weight of resin. If the amount of particulate substance is higher than 40% the melt viscosity of the composition will be too high and the mouldability of the resin composition will be poor.

The amount of particulate substance to be added to the resin composition can be lower than 10% by weight on the weight of resin: in this case no advantage is observed in the mechanical properties but it has been found a consistent improvement of the flame retardant effect especially when the test has been carried out on low thickness specimens.

When the fibrous substance is used, the amount of the product should range from 5% to 50%, preferably from 10% to 30% by weight on the weight of the resin. If the amount is lower than 10%, no advantage is observed in the mechanical properties and if the amount is higher than 30% by weight, the viscosity of the composition will be too high.

The above products can also be used in mixture.

Always according to the present invention, the halogen-free flame retardant thermoplastic composition might be prepared by mixing and kneading the starting components and optionally the additional components in a predetermined ratio as above indicated.

Mixing and kneading operations may be effected in any well known device like banbury mixers, single screw extruders or twin screw extruders and then extruding them. The temperatures at which the components are kneaded are generally comprised between 240° C. and 290° C., but depend on the selected components of the final products.

The extrudates are cooled and pelletized.

It is also possible to premix individual components with thermoplastic resins in order to prepare master batches which may contain the individual components or the whole additives in a predetermined ratio and after that proceed diluting them with other polymers before the extruding phase in an extruder device for producing pellets.

The resulting pellets may be moulded into various mouldings for example through injection moulding, blow moulding or injection compression moulding.

The novel thermoplastic moulding compositions have good mechanical and flame retardant properties.

The compositions according to the invention are suitable for producing mouldings for application in the electrical and electronic fields such as, for example, parts for office automation appliances, for household or industrial use like televisions, telephones personal computers etc.

The invention is described in more detail with reference to the following examples which, however are not intended to restrict the scope of the invention.

EXAMPLES

The components reported in the tables below are compounded in a twin screw extruder set at temperature between 250-280° C. After pelletisation and drying, the pellets were injection moulded into test specimens to be used for the UL 94 flammability test method which prescribes:
- the conditioning of 5 specimens (each formulation and thickness) for 24 h at 23° C. and 50% of relative humidity;
- the positioning of each individual conditioned specimen in vertical position at about 20 cm from a below cotton flock;
- 2 applications of flame for each specimen (the second application starts as soon as the specimen ignited by the first application extinguishes).

The UL 94 test results have been reported in accordance with the following meaning also prescribed by the specification:
V0: when the 5 tested specimens have got total after burning time no longer than 50 sec, less than 10 sec each application of the flame, and no burning drops are allowed.
V1: when the 5 tested specimens have got total burning time less than 150 sec, less than 30 sec each application of the flame and no flaming drops are allowed.
V2: when the 5 tested specimens have got total after burning time of less than 150 sec, less than 30 sec each application of the flame and flaming drops are allowed.

When the test results do not meet the above V0, V1 and V2 criteria, no classification (nc) has been reported in the below tables.

In the following examples following materials were used as started components:

Components A): Resins.

A1) Polycarbonate resin (PC) (Lexan 141 manufactured by GE; MFR (300° C./1.2 kg=10-12 g/10')

A1/A2): PC/ABS 70/30 (PBB104 manufactured by Polyram company).

PC+20% reinforced glass fibre: it has been prepared by extruding the above reported virgin resin with chopped glass fibres epoxysilanized loaded at 20% weight on the weight of final compound.

Components B: Halogen Free Flame Retardant Additives.

Calcium hypophosphite (CP), commercial available material endued with an average particle size (d50%) lower than 10 μm and highest particle size lower than 40 μm.

Aluminium hypophosphite (AP), commercial available material endued with an average particle size (d50%) lower than 10 μm and the highest particle size lower than 30 μm.

Triphenyl phosphate (TPP) commercial available liquid compound.

Components C): Stabilisers and Processing Aids.

In the following examples the following products have been used:

Hyndered phenol heat stabiliser: Irganox® 1010 manufactured by Ciba specialty chemicals.

Process stabiliser: Sandostab® PEPQ manufactured by Clariant.

Polysiloxane oil (PMS): Dow Corning 200® 50CST.

Antidripping agent: Polytetrafluoroethylene (PTFE) (Algoflon F5) manufactured by Montefluos.

Lubricant: pentaerythritol tetrastearate Loxiol® P 861 manufactured by Cognis.

Component D): Filler and/or Reinforcement Agent.

In the experiments have been used following products:

Wollastonite in the acicular form and with UD (length to diameter) ratio of about 10/1.

Chopped glass fibres of 10 μm in thickness (epoxysilanized)

RESULTS

Table 1 shows the flame retardant effect of calcium and aluminium hypophosphites in unfilled PC.

The highest flame proofing effect is satisfied by using: the hypophosphorous acid metal salts alone or in combination with organic phosphoric esters (TPP)

TABLE 1

Flame retardant effectiveness of Calcium hypophosphite and Aluminium hypophosphite in unfilled PC articles:

| | formulations | | | | | | | | |
|---|---|---|---|---|---|---|---|---|---|
| | 1 | 2 | 3 | 4 | 5 | 6 | 7 | 8 | 9 |
| PC (Lexan 141) | 95 | 94.7 | 92 | 96 | 93.7 | 95 | 94.7 | 94 | 93 |
| CP | 5 | 5 | 8 | | | 3 | 3 | 4 | 5 |
| AP | | | | 4 | 6 | | | | |
| TPP | | | | | | 2 | 2 | 2 | 2 |
| PTFE | | 0.3 | | | 0.3 | | 0.3 | | |
| UL 94 (3.2 mm) | V2 | V0 | V0 | V1 | V0 | V1 | V0 | V0 | V0 |
| UL 94 (1.6 mm) | V2 | V0 | V0 | V2 | V0 | V2 | V0 | V1 | V0 |

The table 2 shows the flame retardant effect of calcium hypophosphite (CP) in glass filled PC.

The highest flame proofing effect (i.e: V0 at 1.6 mm in thickness) is satisfied by using the sole additive with or without PTFE as antidripping agent

TABLE 2

Flame retardant effectiveness of Calcium hypophosphite in PC + 20% Glass fibre (GF) reinforced articles

| | Formulations | | | | |
|---|---|---|---|---|---|
| | 1 | 2 | 3 | 4 | 5 |
| PC + 20% GF (%) | 93.2 | 91.2 | 90.9 | 89.2 | 87.2 |
| CP (%) | 6 | 8 | 8 | 10 | 12 |
| PMS (%) | 0.3 | 0.3 | 0.3 | 0.3 | 0.3 |
| Loxiol P861 (%) | 0.3 | 0.3 | 0.3 | 0.3 | 0.3 |
| PEPQ (%) | 0.1 | 0.1 | 0.1 | 0.1 | 0.1 |
| Irg 1010 (%) | 0.1 | 0.1 | 0.1 | 0.1 | 0.1 |
| PTFE (%) | | | 0.3 | | |
| UL 94 (3.2 mm) | V2 | V1 | V0 | V0 | V0 |
| UL94 (1.6 mm) | V2 | V2 | V0 | V2 | V0 |

The table 3 shows the flame proofing effect of calcium and aluminium hypophosphites in PC/ABS alloys (70/30).

The results point out that the products, singly as well as in combination with organic phosphoric esters, are effective flame retardant agents, ranking V0 at 1.6 mm in thickness.

TABLE 3

Flame retardant effectiveness of Calcium and Aluminium hypophosphite in PC/ABS (70/30) alloy.

| | Formulations | | | | | | | |
|---|---|---|---|---|---|---|---|---|
| | 1 | 2 | 3 | 4 | 5 | 6 | 7 | 8 |
| PC/ABS (%) | 86.6 | 85 | 83.6 | 86 | 83 | 81.6 | 80.6 | 83.6 |
| CP (%) | | | | 10 | 8 | 9 | 15 | |
| TPP (%) | 13 | 14.6 | 12 | | 5 | 5 | | |
| AP (%) | | | | | | | | 12 |
| Wollastonite (%) | | | 4 | 4 | 4 | 4 | 4 | 4 |
| PTFE (%) | 0.4 | 0.4 | 0.4 | | | 0.4 | 0.4 | 0.4 |
| UL 94 (3.2 mm) | | | V0 | nc | V2 | V0 | V0 | V0 |
| UL 94 (1.6 mm) | V2 | V1 | V0 | V2 | V2 | V0 | V0 | V0 |

The invention claimed is:

1. Thermoplastic composition comprising at least an hypophosphorous acid metal salts as halogen-free flame retardant agent, and without the presence of a nitrogen containing flame-retardant agent, and at least an aromatic polycarbonate resin wherein said hypophosphorous acid metal salt has an average particle size of the powder (d50%) lower than 40 μm and an highest particle size below 100 μm.

2. Thermoplastic composition according to claim 1, wherein said aromatic polycarbonate resin is blended with a graft copolymer styrenic resin and that the polycarbonate resin/graft copolymer styrenic resin ratio ranges from 60/40 to 90/10.

3. Thermoplastic composition according to claim 2, wherein said polycarbonate resin is obtained by reaction of bis(hydroxyphenyl)alkanes, 2,2bis(4-hydroxyphenyl)propane (bisphenolA), bis(4-hydroxyphenyl)methane, 1,1-bis(4-hydrophenyl)ethane, hydroquinone, resorcinol or catecol.

4. Thermoplastic composition according to claim 1, wherein said polycarbonate resin is a recycled polycarbonate materials, mixed with virgin polycarbonate polymer or blended with an impact modifier resin.

5. Thermoplastic composition according to claim 2, wherein said graft copolymer styrenic resin are selected from impact resistant polystyrene (HIPS), ABS resins, and MBS resins.

6. Thermoplastic composition according to claim 2, wherein said styrenic resin amount ranges from 10% to 40% by weight based on the weight of total resins.

7. Thermoplastic composition according to claim 1, wherein said metal is an alkaline metal belonging to the first, second and third main group or second, seventh, eighth subgroup of the periodic table of the elements.

8. Thermoplastic composition according to claim 7, wherein said metal is selected from Ca, Ba, Mg, Al, Zn, Fe, and B.

9. Thermoplastic composition according to claim 8, wherein said hypophosphorous acid metal salt is calcium hypophosphite and/or aluminum hypophosphite.

10. Thermoplastic composition according to claim 1, wherein said hypophosphorous acid metal salt is present in an amount that ranges from 1% to 30% by weight on the weight of the composition.

11. Thermoplastic composition according to claim 1, wherein said hypophosphorous acid metal salt is present in combination with halogen-free organic phosphoric esters.

12. Thermoplastic composition according to claim 11, wherein said halogen-free organic phosphoric esters are selected from triphenylphosphate, (TPP), tricresyl phosphate, trixylilenphosphate, resorcinoldiphosphate, resorcinolbis diphenylphosphate, bisphenol A bis diphosphate, trimethylphosphate, tributylphosphate, and trioctylphosphate.

13. Thermoplastic composition according to claim 1, wherein said hypophosphorous acid metal salt has a d50% value below 20 μm and an highest particle size below 50 μm.

14. Thermoplastic composition according to claim 1, which also comprises additives and/or fillers, said additives being present in an amount ranging from 0.5 to 5% by weight on the weight of the composition, said fillers being present in an amount up to 50% by weight on the weight of the composition.

15. Thermoplastic composition according to claim 14, wherein said additives are selected from processing aids, heat and process stabilisers, UV stabilisers, antidripping agents, pigments, lubricants, mould releasing agents, colorants, and plasticizers.

16. Thermoplastic composition according to claim 1, which also comprises fluorine-containing ethylene polymers in an amount of up to 2%, based on the weight of thermoplastic composition.

17. Thermoplastic composition according to claim 16, wherein said fluorine-containing ethylene are selected from polytetrafluoroethylene (PTFE) or tetrafluoroethylene-hexafluoropropylene copolymers.

18. Thermoplastic composition according to claim 16, wherein said fluorine-containing ethylene has a particle size of from 0.1 μm to 10 μm.

19. Thermoplastic composition according to claim 14, wherein said fillers are selected from carbon fibers, glass fibers, glass beads, amorphous silica, kaolin, chalk, mica, calcinated kaolin, wollastonite, and talc.

20. Process for the preparation of a thermoplastic composition according to claim 1, wherein the starting components and the additional components are mixed and kneaded in predetermined ratios, extruded and pelletized.

21. Process according to claim 20, wherein the kneading temperature is between 240 and 290° C.

22. Thermoplastic articles obtained using a halogen-free flame retardant composition according to claim 1.

* * * * *